United States Patent [19]

Mineo

[11] Patent Number: 5,544,296
[45] Date of Patent: Aug. 6, 1996

[54] DOCUMENT OUTPUT METHOD

[75] Inventor: Shigeki Mineo, Tokyo, Japan

[73] Assignee: Casio Computer Co., Ltd., Tokyo, Japan

[21] Appl. No.: 350,703

[22] Filed: Dec. 7, 1994

Related U.S. Application Data

[63] Continuation of Ser. No. 46,129, Apr. 12, 1993, abandoned, which is a continuation of Ser. No. 507,048, Apr. 9, 1990, abandoned.

[30] Foreign Application Priority Data

Apr. 24, 1989 [JP] Japan ................... 1-104268

[51] Int. Cl.⁶ ................................................ G06T 1/00
[52] U.S. Cl. ........................................ 395/148; 395/155
[58] Field of Search ................ 395/101–117, 145–146, 395/148–148, 143, 155, 161; 346/23; 345/13–14; 400/68

[56] References Cited

U.S. PATENT DOCUMENTS

| | | | |
|---|---|---|---|
| 4,712,929 | 12/1987 | Kitaoka | 400/76 |
| 4,807,123 | 2/1989 | Komatsu et al. | 364/200 |
| 4,855,939 | 8/1989 | Fitzgerald, Jr. et al. | 364/522 |
| 4,912,669 | 3/1990 | Iwamoto et al. | 364/900 |
| 4,953,105 | 8/1990 | Hirata et al. | 364/519 |
| 5,002,408 | 3/1991 | Hamada et al. | 400/17 |
| 5,016,170 | 5/1991 | Pollalis et al. | 364/401 |
| 5,041,967 | 8/1991 | Ephrath et al. | 364/200 |
| 5,050,101 | 9/1991 | Kiuchi et al. | 364/519 |
| 5,157,767 | 10/1992 | Nihei | 395/149 |

*Primary Examiner*—Mark K. Zimmerman
*Assistant Examiner*—Joseph H. Feild
*Attorney, Agent, or Firm*—Frishauf, Holtz, Goodman, Langer & Chick

[57] ABSTRACT

When a field framing line for surrounding record data upon record data output is drawn on a display screen, the parameters of each line segment constituting the field framing line are generated and stored. When a plurality of stored record items are to be output, the parameters are read out each time the record data is read out. A field frame line is formed on the basis of the readout parameters, and the formed field framing line is output together with the readout record data.

1 Claim, 7 Drawing Sheets

| CLASSIFICATION LEVEL | PRODUCT NAME | NUMBER OF SOLD PRODUCTS | SALES AMOUNT |
|---|---|---|---|
| 1 | TIMEPIECE | 150 | 864.000 |
| 2 | WRIST WATCH | 105 | 630.000 |
| 2 | TABLE CLOCK | 45 | 234.000 |
| 1 | CALCULATOR | 350 | 975.000 |
| 2 | CARD CALCULATOR | 50 | 110.000 |
| 2 | GENERAL CALCULATOR | 125 | 500.000 |
| 2 | FUNCTION CALCULATOR | 12 | 120.000 |
| ⋮ | ⋮ | ⋮ | ⋮ |

| CLASSI-FICATION | TYPE | START POINT | LENGTH | WORD NAME |
|---|---|---|---|---|
| 0 | THICK HORIZONTAL LINE | 5  3 | 25 | |
| | THICK VERTICAL LINE | 5  3 | 2 | PRODUCT NAME |
| | THICK VERTICAL LINE | 15  3 | 2 | NUMBER OF SOLD PRODUCTS |
| | THIN VERTICAL LINE | 20  3 | 2 | SALES AMOUNT |
| | THICK VERTICAL LINE | 30  3 | 2 | |
| 1 | THICK HORIZONTAL LINE | 5  +2 | 25 | |
| | THICK VERTICAL LINE | 5  +2 | 2 | |
| | THICK VERTICAL LINE | 15  +2 | 2 | |
| | THIN VERTICAL LINE | 20  +2 | 2 | |
| | THICK VERTICAL LINE | 30  +2 | 2 | |
| 2 | THICK HORIZONTAL LINE | 8  +2 | 22 | |
| | THICK VERTICAL LINE | 5  +2 | 2 | |
| | THIN VERTICAL LINE | 8  +2 | 2 | |
| | THICK VERTICAL LINE | 15  +2 | 2 | |
| | THIN VERTICAL LINE | 20  +2 | 2 | |
| | THICK VERTICAL LINE | 30  +2 | 2 | |

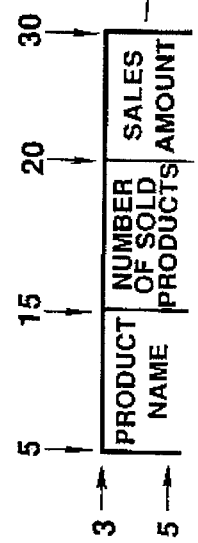

FIG.5A

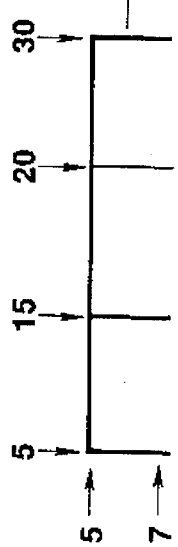

FIG.5B

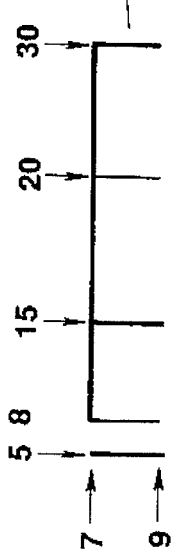

FIG.5C

DOCUMENT OUTPUT METHOD

This application is a continuation of application Ser. No. 08/046,129, filed Apr. 12, 1993 now abandoned, which is a continuation of Ser. No. 07/507,048, filed Apr. 9, 1990 (abandoned).

BACKGROUND OF THE INVENTION

1. Field of the Invention

The present invention relates to a document output method and apparatus for use in personal computers, office computers, and the like.

2. Description of the Related Art

Conventionally, in order to output data classified by items in file-organized records in the form of documents, an optimal document format is set in consideration of the number of records, types of items, the number of words in each item, and the like. The set document format is then printed, and the item-classified data is printed in the printed document format. In other words, the document format is fixed and therefore has no versatility.

In file processing, addition and deletion of records are frequently performed. For example, in order to file-process sales data classified by products or the like, records are added and deleted in accordance with an increase/decrease in the number of products of interest.

As described above, the document format is fixed in conventional techniques. Therefore, in order to output file contents in which the number of records changes in the form of documents, if records are added, field framing lines for surrounding the added records become insufficient, and the document format must be reset. In addition, if records are deleted, the result is an empty area in which no data is printed, thus degrading the appearance of a document and wasting a printing area. In order to eliminate these drawbacks, the document format must be reset.

Assuming that, in a file in which the number of sold products and sales amount, for example, are registered in units of products, the products, as key items, are classified in a plurality of levels, such as a timepiece (major classification), a wrist watch, and a table clock (minor classification), or a calculator (major classification), a card calculator, and a function calculator (minor classification), and records of minor classification are arranged subsequent to those of the corresponding major classification, then, upon the outputting of a document, the dependent relationship between the records can be clarified by changing the pattern of field framing lines surrounding the records, in accordance with the classification level of a key item. However, setting such a document format is very cumbersome.

SUMMARY OF THE INVENTION

It is, therefore, an object of the present invention to provide a document output method and apparatus capable of easily outputting file contents in a document format with a good outer appearance regardless of the type of file contents.

According to a feature of the present invention, a document output method for a data processing unit including a display screen, a key input means, and a memory, the method comprises the computer steps of (a) storing in the memory a plurality of transaction data items, the transaction data items having different classification levels to be appended thereto, and the transaction data items being stored in the memory in accordance with a classification size; (b) drawing by an operator on the display screen a field framing line for surrounding a displayed level-classified transaction data item, the level-classified transaction data item being displayed on the display screen, and the field framing line being drawn on the display screen in accordance with a classification level of the transaction data item which is to be surrounded by a field frame line; (c) arbitrarily designating by the operator, according to the classification levels, a range of a field framing line in accordance with a classification level of the field framing lines drawn on the display screen; (d) obtaining, according to the classification levels, a start point and lengths of field framing lines drawn by the drawing step and for generating, according to the classification levels and from the obtained start point and the length of the field framing line, parameters for outputting line segments constituting the field framing line, the generating step including obtaining, according to the classification levels, the field framing lines included in the range corresponding to the designated classification levels; (e) storing in the memory, according to the classification levels, the generated parameter of the line segments in units thereof; (f) storing in the memory, data indicating an output row position of a transaction data item which is to be recorded on a recording medium; (g) determining, each time a transaction data item stored in the memory is readout, the classification level of the readout transaction data item; (h) reading out parameters and transaction data from the memory and corresponding to the determined classification level; (i) forming a field framing line on the basis of the readout parameters and corresponding to the determined classification level; and (j) printing the formed field framing line together with the readout transaction data item at the output row position where the readout transaction data item is to be recorded.

According to the present invention, a field framing line is formed and output each time record data is read out. Therefore, even if the number of items of record data changes, no unnecessary lines are formed and field frame lines corresponding to the number of items of record data can be automatically formed without resetting a document format, thereby outputting a document with a good outer appearance.

In addition, the document format can be set merely by drawing a repetition pattern model of field framing lines on a display screen, without having to calculate intervals between the lines and the like. Therefore, even if a plurality of types of line repetition patterns exists, the document format can be easily set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 2 is a view showing the contents of a record file;

FIGS. 5A to 5D are views for explaining the processing contents of a format setting controller based on the setting shown in FIG. 4;

DETAILED DESCRIPTION OF THE PREFERRED EMBODIMENTS

An embodiment of the present invention will be described in detail below with reference to FIGS. 1 to 7.

Figure 1:
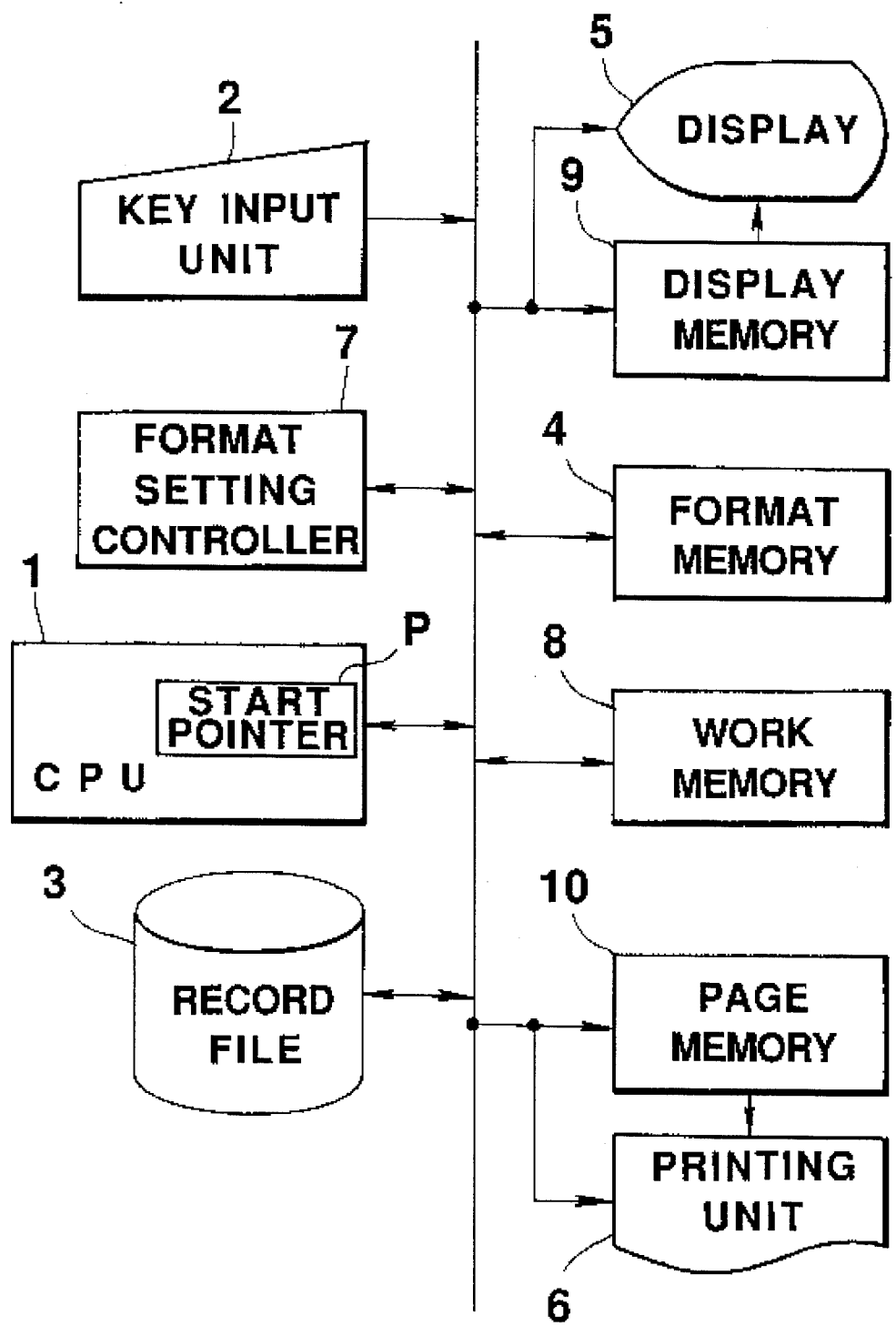
FIG. 1 is a block diagram showing an embodiment of the present invention.

FIG. 1 is a block diagram showing a document output apparatus. This document output apparatus file-processes data which is input from a key input unit 2 on a record file 3 under the control of a CPU 1, and document-outputs the file contents from a display 5 or a printing unit 6 on the basis of document format information which is stored in a format memory 4.

The key input unit 2 has, in addition to data input keys for inputting various types of data, a file key for setting a file processing mode, a set key for setting a document format setting mode, and a document print key for setting a document printing mode.

As shown in FIG. 2, the file contents which are organized on the record file 3 are processed such that product names as key record items are classified into two levels. For example, in the case of a "timepiece", product names are classified into the major classification level "timepiece" and minor classification levels such as "wrist watch" and "table clock". Code "1" representing a major classification level or code "2" representing a minor classification level are set for the major or minor classification, in the header position of each record. Other record data items are "sales amount" and "number of sold products". Records of the major classification and those of the corresponding minor classification are continuously arranged. Note that the "sales amount" or the "number of sold products" records of a major classification is the total of the "sales amount" or the "number of sold products" records of the minor classifications thereof.

Figure 3:
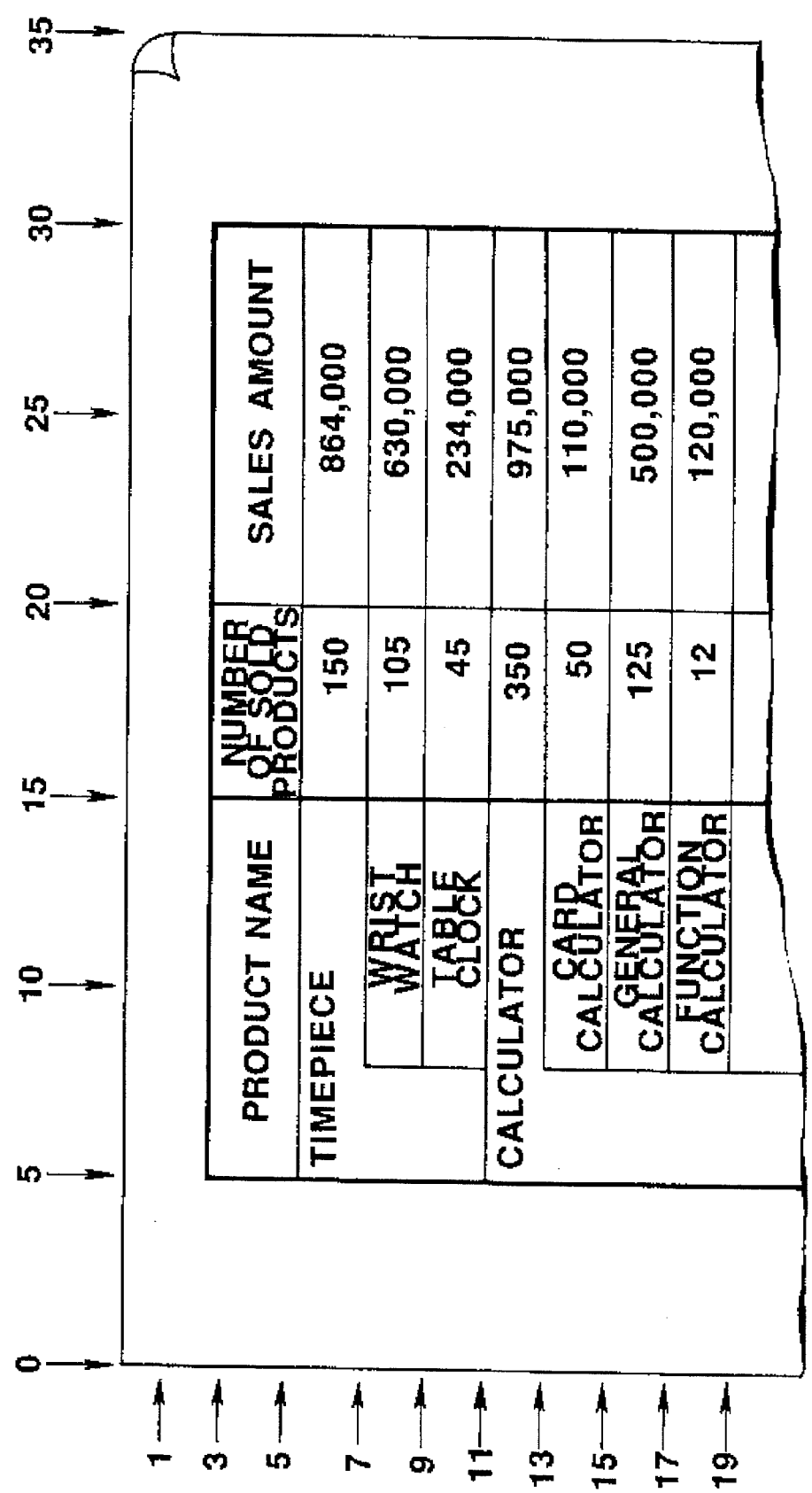
FIG. 3 is a view showing a document format corresponding to the record file shown in FIG. 2.
Figure 4:
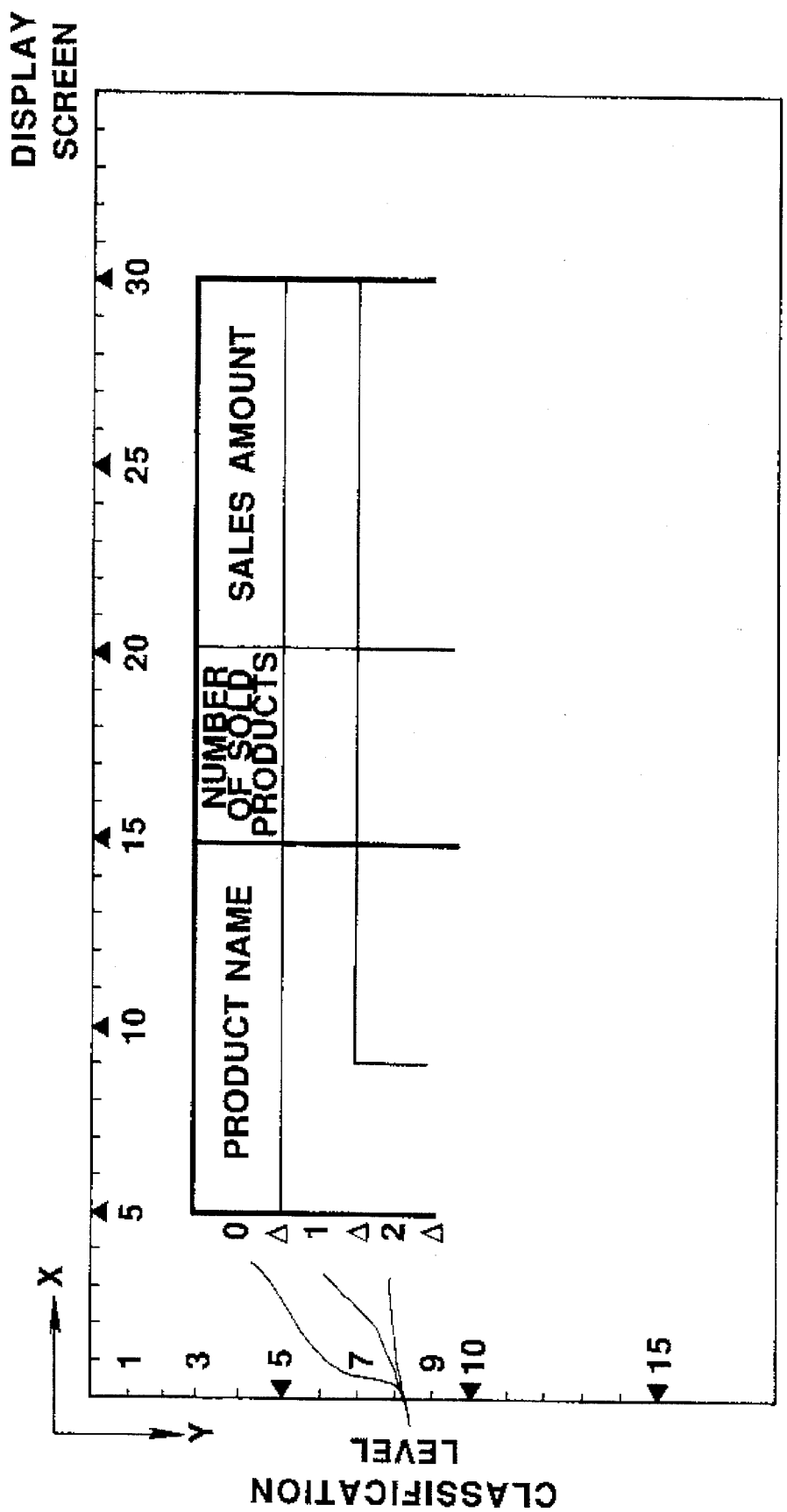
FIG. 4 is a view for explaining how to set the document format shown in FIG. 3.

A document format for document-outputting the above file contents, so that definitions between the classification levels are clearly recognized as shown in FIG. 3, can be easily realized by drawing document format models for the respective classification levels as shown in FIG. 4.

That is, a format setting controller 7 analyzes the field framing lines of each of the classification levels drawn on the display screen of the display 5 by means of the key input unit 2, and obtains, in units of classification levels, parameters for repeatedly outputting the field framing line pattern when documents are output. These parameters are stored in the format memory 4 as document format information. The CPU 1 sequentially reads out record data from the record file 3, and checks the classification level of the data. The CPU 1 then determines field framing line output contents on the basis of corresponding parameters, and sequentially outputs the contents together with the record data.

A start pointer P and a work memory 8 in the CPU 1 are used in this process. The start pointer P stores an output row position, i.e. the Y-coordinate component of the record data, on an output medium. Under the control of the CPU 1, the display data of one display on the screen is stored in a display memory 9, and the printing data of one page is stored in a page memory 10. The record file 3 stores the record data of one page.

An operation of this embodiment will be described below with reference to FIGS. 4 to 7.

The setting process of a document format will be described first.

Figure 6:
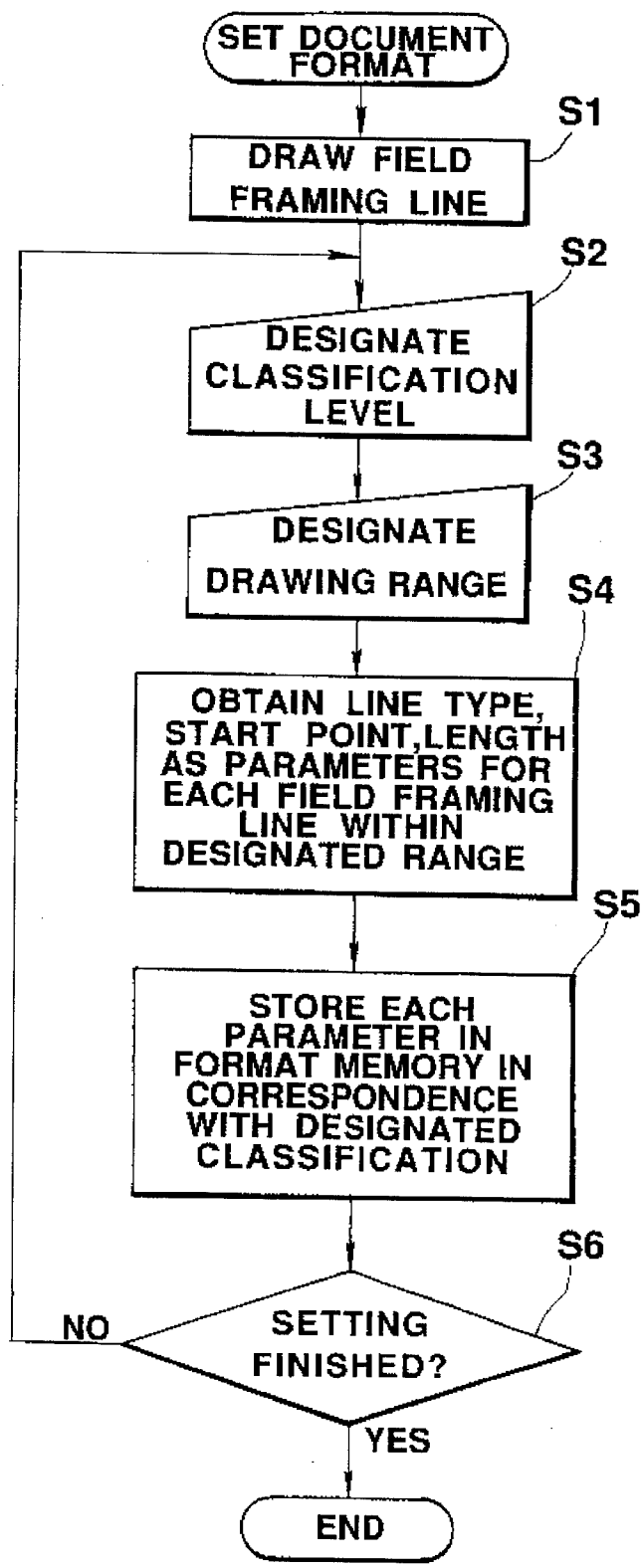
FIG. 6 is a flow chart for explaining document format setting processing performed by the format setting controller.

In a document format setting mode, words representing data items are input by operating the key input unit 2 as shown in FIG. 4, and a model of field framing lines for surrounding the words and record data of each classification level is drawn on the display screen of the display 5 (step S1 in FIG. 6). Note that the scales displayed at the left and upper portions of the display screen shown in FIG. 4 represent the number of digits on the page, when printed.

A classification level is designated (step S2), and drawing range designated (step S3), i.e. as shown in FIG. 4, symbols Δ and codes representing the classification levels are input at the left side of the drawn field framing lines, thereby designating the field framing line corresponding to each classification level. Designation of the classification level is performed such that codes "0", "1", and "2" are input for a word indicating a title item, and major and minor classification records, respectively. Designation of the drawing range is performed by a cursor. As is apparent from the symbols Δ shown in FIG. 4, the X direction can be arbitrarily set as long as the Y direction is accurated designated. That is, range designation can be easily performed.

When the drawing range is designated in step S3, the format setting controller 7 obtains, as parameters for repeatedly outputting the document format composed of the field framing lines within the designated range, i.e. line segments, the type, the start point, and the length of each line segment (step S4). The obtained parameters are registered in the format memory 4 in correspondence with the classification levels designated in step S2 (step S5).

The CPU 1 checks whether document format registration to the format memory 4 is finished (step S6). If the registration is not finished, the flow returns to step S2, and the document format registration is continuously performed. That is, drawing input processing and document format registration processing are separately performed. Therefore, since the same function can be continuously used, the document format can be rapidly set.

The processing tasks in steps S4 and S5 will be described in detail below.

Assume that document format models for respective classification levels are drawn as shown in FIG. 4, and the range shown in FIG. 5A is designated as classification level "0".

In this case, the format setting controller 7 analyzes a document format model within the designated range on the display memory 9, generates the type (the direction and the line type), the start point, and the length, of each line segment as parameters, and registers the generated parameters in the format memory 4 in correspondence with the classification level "0". That is, of five line segments in the designated range, "thick horizontal line", (5, 3), and "25" are registered respectively as the type, the start point, and the length for one horizontal line segment. In addition, "thin vertical line", (20, 3), and "2" are registered respectively as the type, the start point, and the length for the third vertical line segment from the left. Note that a word is registered in correspondence with the parameters of the line segment to the left of the word.

If the range shown in FIG. 5B is designated as classification level "1", of five line segments within the designated range, "thin horizontal line", (5, +2), and "25" are registered respectively as the type, the start point, and the length for one horizontal line segment. In addition, "thick vertical line", (30, +2), and "2" are registered respectively as the type, the start point, and the length for a vertical line segment at the right-hand end.

If the range shown in FIG. 5C is designated as the classification level "1", of six line segments within the designated range, "thin horizontal line", (8, +2), and "22" are respectively registered as the type, the start point, and the length for one horizontal line segment. In addition, "thin vertical line", (8, +2), and "2" are respectively registered as the type, the start point, and the length for a vertical line segment next to the leftmost line segment.

Note that "+2" of the Y-coordinate component of the start point indicates that the Y-coordinate component of the start point of a corresponding line segment is incremented by two rows each time one record is output, i.e, indicates an updating width of the Y-coordinate component of the start point of each line segment. This updating width of the Y-coordinate component is the same for every line segment.

Figure 7:
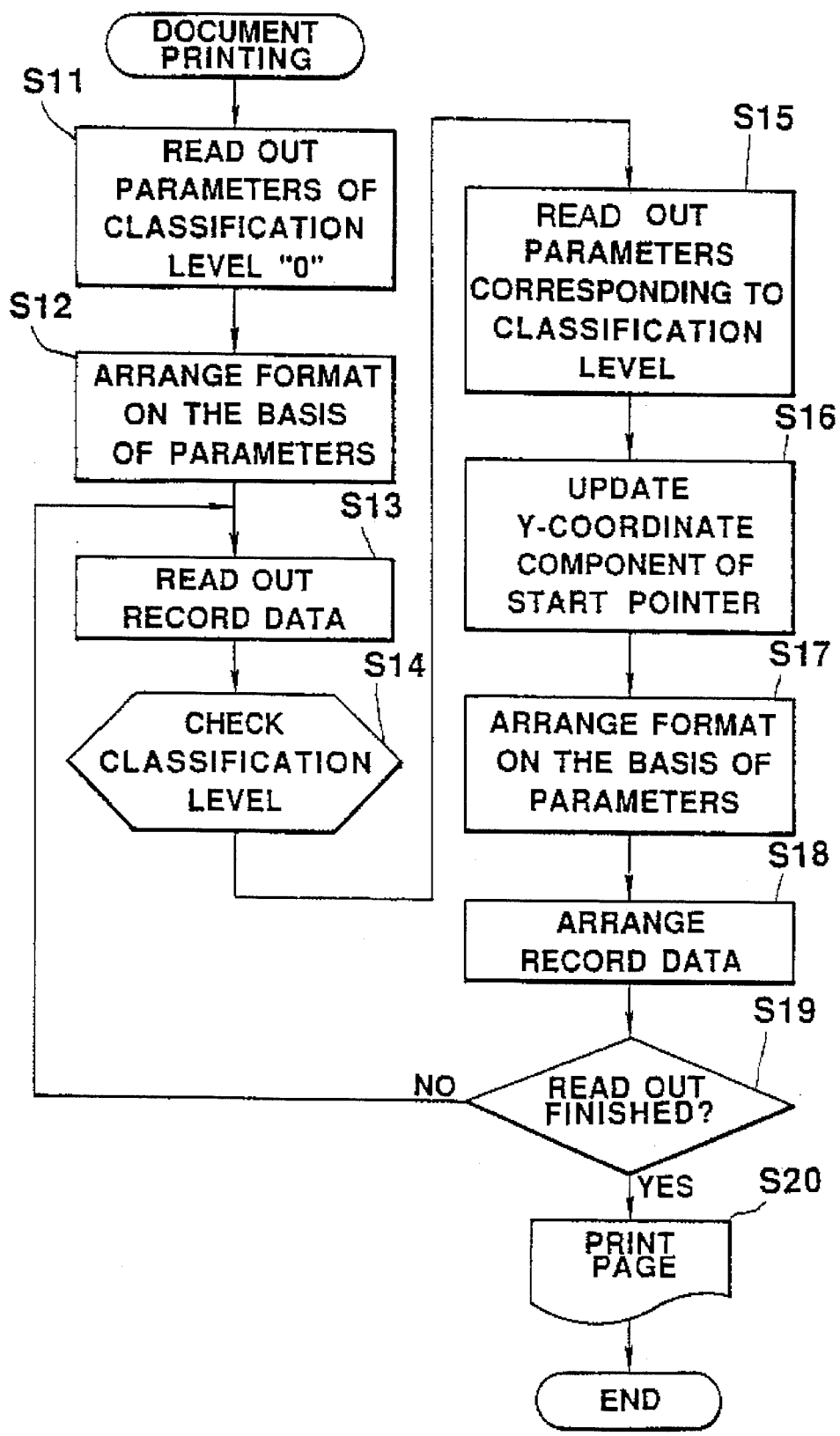
FIG. 7 is a flow chart for explaining document printing processing performed by a CPU.

The document printing processing will be described below with reference to FIG. 7.

In the document printing mode, the CPU 1 reads out the parameters and words of the classification level "0" from the format memory 4 and stores them in the work memory 8 (step S11). On the basis of the parameters stored in the work memory 8, the CPU 1 determines line segment output contents and arranges them in the page memory 10 together with the words (step S12). In this case, each line segment is arranged while the start pointer P in the CPU 1 is updated on the basis of the start-point parameter. The Y-coordinate component of the start pointer P is fixed since it is common for each line segment. For examples, in the case of the parameter of the classification level "0" shown in FIG. 5D, the Y-coordinate components of the start-point parameters of the respective line segments are all "3". Therefore, the Y-coordinate component of the start pointer P is fixed at "3".

Record data of one record are sequentially read out from the start position of the record file 3 and stored in the work memory 8 (step S13), and the classification level of a key item is checked (step S14). Parameters corresponding to the classification level are then read out from the format memory 4 and stored in the work memory 8 (step S15).

The Y-coordinate component of the start pointer P is updated by the Y-coordinate component updating width common for all line segments in the start-point parameters stored in the work memory 8, thereby determining the Y-coordinate component of the start point of a line segment with respect to record data currently being read out (step S16).

On the basis of the parameters, the output contents of the line segment with respect to the record data read out in step S13 are determined and arranged in the page memory 10 (step S17). Record data of the corresponding item are arranged in an area surrounded by the line segments (step S18).

The CPU 1 checks whether all the record data are completely read out from the record file 3, i.e, whether record data of one page are completely read out (step S19). If the read out is not finished, the flow returns to step S13. This means that the document format is sequentially formed each time record data are read out.

If the record data of one page are completely read out, the printing unit 6 simultaneously prints out the document printing data of one page in the page memory 10 (step S20), and the operation is ended. The printed results as shown in FIG. 3 are obtained if the contents of the record file 3 are as shown in FIG. 2 and the contents of the format memory 4 are as shown in FIG. 5.

Note that the parameters of each line segment are stored as shown in FIG. 5D. Each line segment, however, can be stored by parameters concerning the start and end points, or the parameters shown in FIG. 5D may be converted and stored in another form. In addition, the scales shown in FIG. 4 need not be limited but can be reduced or enlarged in accordance with the size of paper used.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A document output method for a data processing unit including a display screen, a key input means, and a memory, the method comprising the computer steps of:

a) storing in the memory a plurality of transaction data items, said transaction data items having different classification levels to be appended thereto, and said transaction data items being stored in the memory in accordance with a classification size;

b) drawing by an operator on the display screen a field framing line for surrounding a displayed level-classified transaction data item, said level-classified transaction data item being displayed on the display screen, and said field framing line being drawn on the display screen in accordance with a classification level of the transaction data item which is to be surrounded by a field frame line;

c) arbitrarily designating by the operator, according to the classification levels, a range of a field framing line in accordance with a classification level of the field framing lines drawn on said display screen;

d) obtaining, according to the classification levels, a start point and lengths of field framing lines drawn by said drawing step and for generating, according to the classification levels and from the obtained start point and the length of the field framing line, parameters for outputting line segments constituting the field framing line, said generating step including obtaining, according to the classification levels, the field framing lines included in the range corresponding to the designated classification levels;

e) storing in the memory, according to the classification levels, the generated parameter of said line segments in units thereof;

f) storing in the memory, data indicating an output row position of a transaction data item which is to be recorded on a recording medium;

g) determining, each time a transaction data item stored in said memory is readout, the classification level of the readout transaction data item;

h) reading out parameters and transaction data from said memory and corresponding to the determined classification level;

i) forming a field framing line on the basis of the readout parameters and corresponding to the determined classification level; and j) printing the formed field framing line together with the readout transaction data item at the output row position where the readout transaction data item is to be recorded.

* * * * *